United States Patent
Pearl, Jr. et al.

(10) Patent No.: US 11,143,015 B2
(45) Date of Patent: Oct. 12, 2021

(54) DETECTION OF LOCATION OF CEMENT

(71) Applicant: HALLIBURTON ENERGY SERVICES, INC., Houston, TX (US)

(72) Inventors: William Cecil Pearl, Jr., Spring, TX (US); John L Maida, Houston, TX (US); Daniel Joshua Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 16 days.

(21) Appl. No.: 16/637,959

(22) PCT Filed: Sep. 27, 2017

(86) PCT No.: PCT/US2017/053769
§ 371 (c)(1),
(2) Date: Feb. 10, 2020

(87) PCT Pub. No.: WO2019/066812
PCT Pub. Date: Apr. 4, 2019

(65) Prior Publication Data
US 2020/0182042 A1   Jun. 11, 2020

(51) Int. Cl.
*E21B 47/00* (2012.01)
*E21B 47/095* (2012.01)
(Continued)

(52) U.S. Cl.
CPC .......... *E21B 47/005* (2020.05); *C04B 28/02* (2013.01); *E21B 33/14* (2013.01); *E21B 47/095* (2020.05); *E21B 47/135* (2020.05)

(58) Field of Classification Search
CPC .... E21B 47/005; E21B 47/095; E21B 47/135; E21B 33/14; E21B 33/12; E21B 33/13; C04B 28/02; Y02W 30/91; C09K 8/473
See application file for complete search history.

(56) References Cited

U.S. PATENT DOCUMENTS 4,800,537 A   1/1989   Mount
8,083,849 B2  12/2011  Lewis et al.
(Continued)

FOREIGN PATENT DOCUMENTS

WO   2015026319 A1   2/2015

OTHER PUBLICATIONS

Lura, st al., "Early-age acoustic emission measurements in hydrating cement paste: Evidence for cavitation during solidification due to self-desiccation", Cement and Concrete Research; vol. 39, Issue 10, Oct. 2009, pp. 861-887.
(Continued)

*Primary Examiner* — Giovanna Wright
*Assistant Examiner* — Yanick A Akaragwe
(74) *Attorney, Agent, or Firm* — McGuireWoods LLP

(57) ABSTRACT

Included are cement compositions and methods and systems for locating the cement compositions in a wellbore. An example method comprises deploying a sensing system in the wellbore and introducing the cement composition into the wellbore. The cement composition comprises a cement and hollow beads having a crush pressure and configured to emit an acoustic signal when imploded. The method further comprises pumping the cement composition through the wellbore to a depth with a wellbore pressure exceeding the crush pressure of the hollow beads to induce implosion of the hollow beads and the emission of the acoustic signal. The method further comprises sensing the emitted acoustic signal and determining the location of the cement composition in the wellbore from the sensed emitted acoustic signal.

20 Claims, 10 Drawing Sheets

(51) Int. Cl.
*E21B 47/005* (2012.01)
*E21B 47/135* (2012.01)
*C04B 28/02* (2006.01)
*E21B 33/14* (2006.01)

(56) References Cited

U.S. PATENT DOCUMENTS

| | | | |
|---|---|---|---|
| 8,408,064 | B2 | 4/2013 | Hartog et al. |
| 8,636,063 | B2 | 1/2014 | Ravi et al. |
| 2004/0226715 | A1 | 11/2004 | Willberg et al. |
| 2011/0199228 | A1* | 8/2011 | Roddy ............... E21B 33/13 340/856.4 |
| 2013/0021874 | A1 | 1/2013 | Hartog et al. |
| 2014/0034823 | A1 | 2/2014 | Hyde-Barber |
| 2014/0121979 | A1 | 5/2014 | Grimsbo et al. |
| 2014/0208841 | A1* | 7/2014 | Hausot ............... A61B 5/1468 73/152.24 |
| 2014/0338896 | A1 | 11/2014 | McGarian et al. |
| 2015/0344376 | A1 | 12/2015 | Bowers et al. |
| 2016/0138389 | A1* | 5/2016 | Stokely ............... E21B 47/107 340/854.7 |
| 2016/0266086 | A1* | 9/2016 | Von Herzen ....... G01N 29/2481 |
| 2018/0258757 | A1* | 9/2018 | Werry .................. C09K 8/03 |

OTHER PUBLICATIONS

Bolshakov, A. O., et al. "Use of electromagnetic acoustic transducers (emats) for cement bond logging of gas storage wells", AIP Conference Proceedings, 975, 809-816 (2008).

Chen, et al. "Fiber optic acoustic emission distributed crack sensor for large structures", Journal of Structural Control. vol. 7, Issue 1, pp. 119-129, Jun. 2000.

International Search Report and Written Opinion in International Appln No. PCT/US2017/053769, dated Jun. 12, 2018.

\* cited by examiner

DETECTION OF LOCATION OF CEMENT

TECHNICAL FIELD

The present disclosure relates to the use of cement locating systems to detect location of a cement composition as it is pumped in a wellbore, and more particularly, to cement locating systems comprising sensing systems used to sense the implosion of hollow beads distributed in a cement composition, and correlating these sensed implosions to the location of the cement composition as it is pumped in the wellbore.

BACKGROUND

Cementing operations in subterranean formations may be performed to stabilize wellbore components in the wellbore. During a cementing operation, it may be important to locate a portion or particular area of the cement to learn if the cement successfully reached its target location. During the pumping portion of the cementing operation, cement location is estimated using known wellbore and operation parameters such as the depth of the desired location in the wellbore and the volume/pump rate of the cement being introduced into said wellbore. However, these estimates may not be accurate if the subterranean formation contains loss/seepage zones into which a portion of the cement may be lost.

Current methods used in the field for measuring the location of the cement may include creating a cement bond log (e.g., a neutron bond log) which may be used in some circumstances to determine the top of the cement. Alternatively, the temperature differential between the top and bottom of the cement may be used to discern their respective locations. However, issues may exist with these methods. For example, these methods may only be performed after the cement has sufficiently cured, and the location of any loss/seepage zones would not be determined until after the cement has been placed. As such, there may be no opportunity for remediation of a problem zone during the cementing operation, precluding the ability to initiate mitigation actions during the cementing operation and thus prevent or reduce the risk of non-uniformities from occurring in the cured cement.

As such, the inability to monitor a cementing operation prior to curing may result in an insufficient cementing job with a cured cement that did not reach its target location and/or is non-uniform and may be poorly bonded to the formation and/or casing. As a result, an insufficient cementing job may require additional operational expenditures and additional operational time investment, and could even result in reduced well productivity over the long-term if not sufficiently corrected.

BRIEF DESCRIPTION OF THE DRAWINGS

Illustrative examples of the present disclosure are described in detail below with reference to the attached drawing figures, which are incorporated by reference herein, and wherein.

Figure 1:
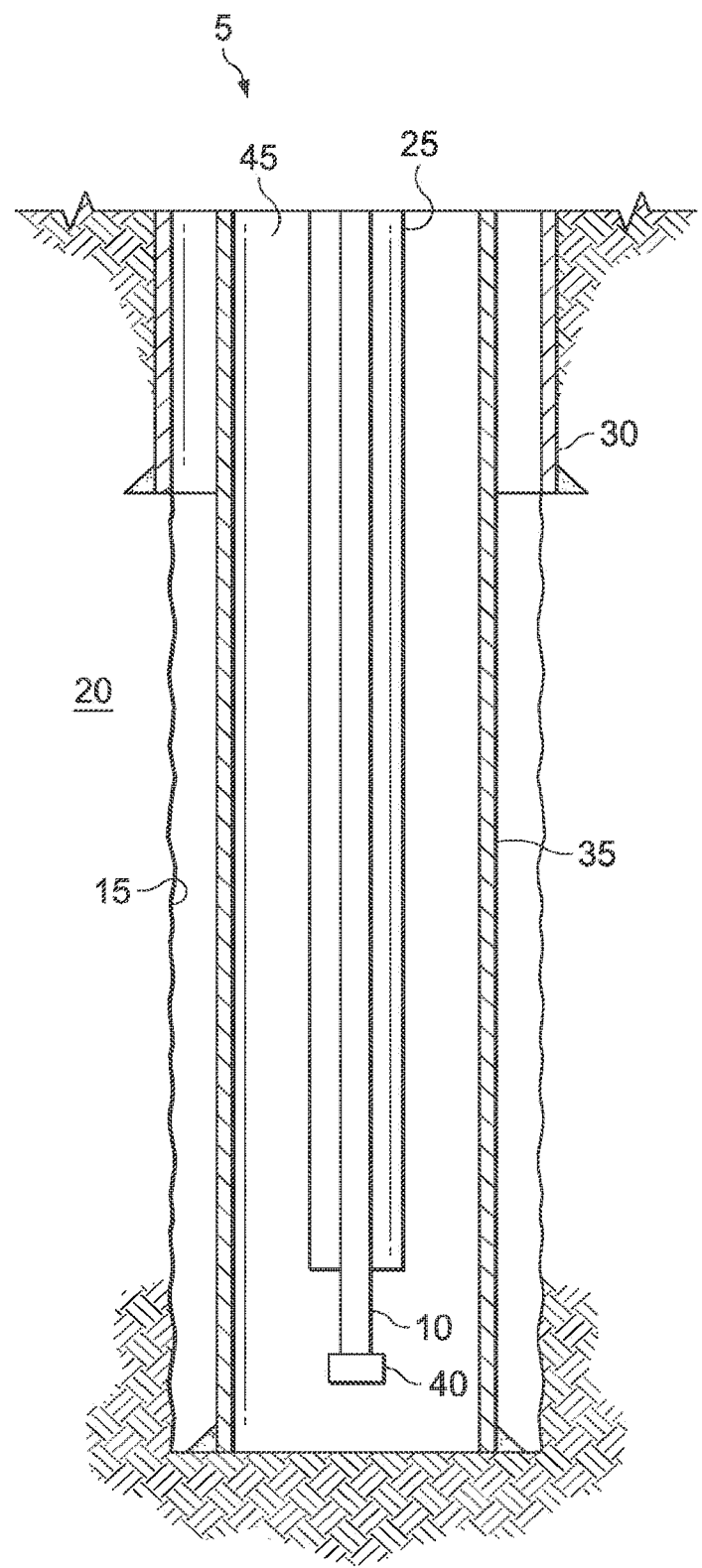
FIG. 1 is a cross-section illustrating an example cement locating system having a retrievable sensing system of one configuration in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of cement locating systems to detect the location of a cement composition as it is pumped in a wellbore, and more particularly, to cement locating systems comprising sensing systems used to sense the implosion of hollow beads distributed in a cement composition, and correlating these sensed implosions to the location of the cement composition as it is pumped in the wellbore.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein comprise the use of a cement composition comprising hollow beads. The cement composition may be introduced into a wellbore penetrating a subterranean formation. The subterranean formation may be a subterranean formation subject to or intended to be subject to a cementing operation. The hollow beads have a crush pressure, which is the pressure at which the beads may implode. The crush pressure may be determined experimentally, calculated numerically, derived from theory, or may be ascertained from the pressure rating of the hollow beads, if known. Within the wellbore, wellbore pressure increases with increasing depth. The hollow beads may implode when the hollow beads are transported to a wellbore depth where the wellbore pressure surpasses the crush pressure of the hollow beads or when sufficient pressure is applied to initiate the implosion. Without limitation, as the hollow beads may be transported in the pumped cement composition to the target location of the cement composition within the wellbore, the location where the hollow beads implode is also the location where the cement composition reached a wellbore depth where the wellbore pressure exceeded the crush pressure of the hollow beads. The implosion of the hollow beads may be sensed by sensing systems distributed in the wellbore. The wellbore operator may select the crush pressure of the hollow beads to correlate their crush pressure with a wellbore pressure corresponding to a desired target location for the cement composition (e.g., bottom hole of the wellbore), which may be obtained from the known wellbore pressure gradient/pressure distribution of the wellbore. As such, the hollow beads may survive transport in the cement composition until surpassing their crush pressure, which may be selected so as to be a pressure threshold of approximately the same pressure as the wellbore pressure of the target location for the cement composition. Upon surpassing the pressure threshold, the hollow beads may implode and emit an omnidirectional acoustic signal. The omnidirectional acoustic signal may be detected by the distributed or quasi-distributed sensing system and convey to the wellbore operator that the cement composition has reached the desired cement location. As the hollow bead implosion is sensed and conveyed to the wellbore operator, the wellbore operator may be able to track the cement composition as it is pumped through the wellbore. Further, some examples may comprise the use of hollow beads having different characteristics such that the hollow beads produce distinct and known frequencies as their respective omnidirectional acoustic signal when the hollow beads implode. These hollow beads may be distributed in different portions of the cement such that each portion contains hollow beads that will produce a distinct frequency for the emitted omnidirectional acoustic signal. The sensing systems may detect the different frequencies as the beads implode when transported past their pressure thresholds, allowing the wellbore operator to determine when a specific portion of cement has passed a specific wellbore depth. These methods may also potentially allow the wellbore operator to determine if loss/seepage zones are present as the wellbore operator may be able to track when portions of the cement composition are not reaching their target locations as predicted. Further, by using other sensing methods, the wellbore operator may also be able to determine the locations of these loss-seepage zones.

The example hollow beads described herein are substantially hollow, rigid, and particulate objects. As used herein, the term "substantially hollow" refers to a structure that, in some examples, may not be completely enclosed and may include defects like indentations, protrusions, holes, and the like. The term "bead" does not imply any specific shape, and the structure of the hollow beads may comprise any shape so long as said shape is substantially hollow. General examples of the hollow beads may include, but are not limited to, hollow glass beads, hollow ceramic beads, hollow plastic beads, hollow metal beads, hollow resin beads, hollow composite beads, or any object that is composed of a hard shell, containing a collapsible or compressible material, with the ability to implode, composites thereof, or any combination thereof. Specific examples of the hollow beads may include, but are not limited to, glass spheres, glass microspheres, ceramic spheres, cenospheres, plastic spheres, metal spheres, composites thereof, or any combination thereof. The hollow beads may comprise materials including, but not limited to, glass, silicates, soda lime, borosilicates, fly ash, ceramic, resins, metals, polymers, or any highly brittle material, composites thereof, or any combination thereof. With the benefit of this disclosure, one of ordinary skill in the art will be readily able to select a hollow bead for a given application.

The hollow beads may be selected or manufactured to provide hollow beads having specific physical characteristics that impart desired hollow bead properties such as a specific crush pressure and emission of a specific acoustic signal frequency. For example, a wellbore operator may select or manufacture hollow beads having a specific crush pressure, or range of crush pressure, and emitting a specific frequency for the acoustic emission signal when imploded. The wellbore operator may select beads to have a specific distribution of response. For example, the wellbore operator may select the beads to have a very broad pressure response (imploding all the way downhole) or a very narrow response (imploding only at a very precise pressure downhole). The wellbore operator may then use these known properties to determine when a cement composition comprising the hollow bead has surpassed the pressure threshold of a target location by sensing the specific frequency of the emitted acoustic signal produced from the implosion of the hollow beads. As such, the hollow beads may be selected or manufactured based on one or more of their physical characteristics including, but not limited to, source material, diameter, wall thickness, bead size, bead shape, mechanical strength, brittleness, glass transition temperature, melting temperature, degradation rate when exposed to acids, bases, or organics, or any combination thereof. Therefore, the wellbore operator may employ hollow beads having a known crush pressure and a known frequency for the emitted acoustic signal. For example, hollow beads may be manufactured to have a specific diameter and be made from a specific material so as to provide a hollow bead having a specific crush pressure and a hollow bead capable of emitting a specific acoustic frequency when imploded. As an alternative example, hollow beads may be selected based on their size and wall thickness in order to provide a hollow bead having a specific crush pressure and a hollow bead capable of emitting a specific acoustic frequency when imploded. With the benefit of this disclosure, one of ordinary skill in the art will be readily able to determine if a hollow bead has a specific crush pressure and specific acoustic emission signal frequency for a given application. With the benefit of this disclosure one of ordinary skill in the art will be readily able to select or manufacture a hollow bead comprising source material, diameter, wall thickness, bead size, bead shape, mechanical strength, brittleness, glass transition temperature, melting temperature, degradation rate when exposed to acids, bases, or organics, or any combination thereof, etc. to provide a hollow bead having a specific crush pressure and specific acoustic emission signal frequency for a given application.

In some examples, the hollow beads may be provided surface coating treatments, in order to reduce premature surface degradation/pitting rates. The surface coating treatments may include, but are not limited to, resins, silicates, polymers, metals, organosilicons, chemically-attached organic monolayers, composites thereof, or any combination thereof. With the benefit of this disclosure, one of ordinary skill in the art will be readily able to select a surface coating treatment for the hollow beads for a given application.

The hollow beads may be added to a cement composition that is introduced into a wellbore. The concentration of the hollow beads in the cement composition may range from about $10^{-18}$% (V/V) of the cement composition to about 99% (V/V) of the cement. The concentration of the hollow beads in the cement may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the hollow beads in the cement composition may be about $10^{-18}$% (V/V)) of the cement composition, about $10^{-10}$% (V/V) of the cement composition, about $10^{-1}$% (V/V) of the cement composition, about 1% (V/V) of the cement composition, about 5% (V/V) of the cement composition, about 10% (V/V) of the cement composition, about 20% (V/V) of the cement composition, about 50% (V/V) of the cement composition, about 75% (V/V) of the cement composition, or about 99% (V/V) of the cement composition. With the benefit of this disclosure, one of ordinary skill in the art will be readily able to obtain and prepare a cement composition comprising the hollow beads for a given application.

Examples of the methods and systems described herein comprise the use of a cement composition. As previously mentioned, the cement composition comprises the hollow beads and transports the hollow beads in the wellbore. Any of a variety of hydraulic cements suitable for use in subterranean cementing operations may be used in the cement composition. Suitable examples include hydraulic cements that comprise calcium, aluminum, silicon, oxygen, and/or sulfur, and which set and harden by reaction with water. Such hydraulic cements, include, but are not limited to, Portland cements, pozzolan cements, gypsum cements, high-alumina-content cements, slag cements, silica/lime cements, or any combination thereof. In certain specific examples, the hydraulic cement may comprise a Portland cement. The Portland cements that may be suitable for use include Portland cements classified as Class A, C, H and G cements according to American Petroleum Institute, Recommended Practice for Testing Well Cements, API Specification 10B-2 (ISO 10426-2), First edition, July 2005. In addition, in some examples, cements suitable for use may include cements classified as ASTM Type I, II, III, IV, or V. Further, as described above, the cement composition may be portioned in a manner such that hollow beads comprising different crush pressures and different acoustic emission signal frequencies may be distributed and dispersed into different portions. Such portioning may occur as the cement is being prepared or may occur as the cement is introduced into the wellbore. "Portioning" as used herein does not necessarily describe a physical separation of distinct volumes of cement, but instead refers to the addition of specific species of hollow beads as described above into different volumes of cement such that the distributions of the hollow bead species do not overlap and occur in the same portion of the cement composition. For example, a cement composition may comprise at least two portions. The first portion of the cement composition may comprise a first plurality of hollow beads comprising a first crush pressure and configured to emit a first acoustic signal frequency when imploded. The second portion of the cement composition may comprise a second plurality of hollow beads comprising a second crush pressure and configured to emit a second acoustic signal frequency when imploded. Further, the first portion of the cement composition and/or the second portion of the cement composition may comprise additional pluralities of hollow beads (e.g., a third plurality, fourth plurality, etc.) having distinct crush pressures and distinct acoustic signal frequencies so that the respective portions can be monitored as they progress downhole.

As discussed, the hollow beads transported in the cement composition may implode when the wellbore pressure exceeds the crush pressure of the hollow beads. The implosion of the hollow beads may emit an omnidirectional acoustic signal. The omnidirectional acoustic emission signal may be detected by sensing systems disposed in the wellbore. Examples of these sensing systems include, but are not limited to, Sagnac Effect interferometric sensing systems, Rayleigh backscatter time or frequency domain acoustic sensing systems, Fizeau sensing systems, Fabry-Perot sensing systems, Michelson sensing systems, Mach-Zehnder sensing systems, pseudo-distributed point fiber Bragg gratings systems, macro- or microbending attenuation sensor, point pressure systems (e.g., piezoelectric, electromechanical, accelerometer, microphone, geophone, etc.) coupled to a fiber optic cable or electrical telemetry system, composites thereof, or any combination thereof. The sensing systems may be disposed in the wellbore prior to cementing. The sensing systems may comprise a fiber optic cable or other telemetry system (e.g., electrical telemetry system) comprising a cable for telecommunication. The sensing system may be able to detect the implosion of the hollow beads and a time series signal, corresponding to strain, velocity, acceleration, rotation, twist, pressure, etc. will be sensed. A discrete or fast Fourier transform of that signal may be made in various software in real-time, and this may allow the operator to observe/record the frequency spectrum (and hence primary frequency peaks). The sensing system may be run into the wellbore at any time prior to cementing. As discussed below, the sensing system may be permanent or retrievable depending on the sensing system installation configuration. The cable of the sensing system may be run in a linear axial direction along the length of the wellbore or may be coiled in an axial direction along the length of the wellbore. Alternatively the cable of the sensing system may be coiled or placed in an azimuthal direction around the casing. Example configurations of the sensing system are described below in FIGS. 1-4. In some examples, multiple sensing systems may be distributed in the wellbore in slightly different positions and orientations. The multiple sensing systems may be monitored simultaneously and allow the omnidirectional acoustic emission signal to be triangulated. Using said triangulation, the extent that the cement may be lost to the formation (with an estimation of formation geometry) may be calculated based on relative acoustic pressure sound levels between the multiple distributed sensing systems. As such, the presence and location of loss/seepage zones may be identified.

In an alternative example, the hollow beads may be triggered to implode by setting an acoustic emitter within range of the cement composition. The acoustic emitter may emit an acoustic frequency at the resonance frequency of the hollow beads, which may induce the implosion of the hollow beads. The emitter may be used to trigger the implosion of a specific plurality of beads, but not others, depending on their resonance frequencies, bandwidths, and Q factors. The acoustic emitter may be located at positions of interest in the wellbore such as the shoe or at a casing joint.

The present disclosure provides methods and systems for location of a cement composition introduced into a wellbore. The methods and systems include a sensing system disposed in a wellbore. The methods may include adding hollow beads having a known crush pressure and a known acoustic emission signal frequency to the cement composition. The cement composition may be introduced into the wellbore subsequent to the placement of at least one sensing system in the wellbore. The methods may further include the sensing of the implosion of the hollow beads as the crush pressure of the hollow beads is exceeded during transport of the hollow beads in the wellbore. Said sensing may comprise sensing the known acoustic emission signal frequency of the imploded hollow beads. The sensed acoustic emission signal frequency may be used to determine the location of the cement composition based upon the location at which the crush pressure of the hollow beads was exceeded in the wellbore.

FIG. 1 is a cross-section illustrating an example cement locating system 5 having a retrievable sensing system 10 of one configuration in accordance with the examples disclosed herein. Cement locating system 5 comprises a retrievable sensing system 10. Retrievable sensing system 10 may be any sensing system disclosed herein and may comprise a fiber optic cable or other telemetry cable coupled to a wireline, slickline, or other such conveyance line (note: conveyance line obscured by the retrievable sensing system 10 in FIG. 1) sufficient for lowering downhole and retrieving the retrievable sensing system 10. As illustrated, retrievable sensing system 10 may extend downhole into wellbore 15 which penetrates subterranean formation 20. Retrievable sensing system 10 may be lowered through conduit 25, past surface casing 30, and into production casing 35 if desired. Conduit 25 may be any type of conduit used in a wellbore, including but not limited to, tubing, coiled tubing, drillpipe, stick pipe, production tubing, etc. At the terminal end of the retrievable sensing system 10 is bottomhole pressure and temperature gauge 40. As the cement composition is pumped down production casing annulus 45, retrievable sensing system 10 may sense the omnidirectional acoustic emission signal emitted from the implosion of the hollow beads when the cement composition reaches a depth where the pressure in wellbore 15 exceeds the crush pressure of the hollow beads. Via retrievable sensing system 10, the sensed acoustic emission signal may then convey to the wellbore operator that the cement composition has arrived at its target location. The wellbore operator may then retrieve retrievable sensing system 10 by withdrawing the conveyance line (i.e., the conveyance line to which retrievable sensing system 10 is coupled) uphole through conduit 25 and back to the surface.

Figure 2:
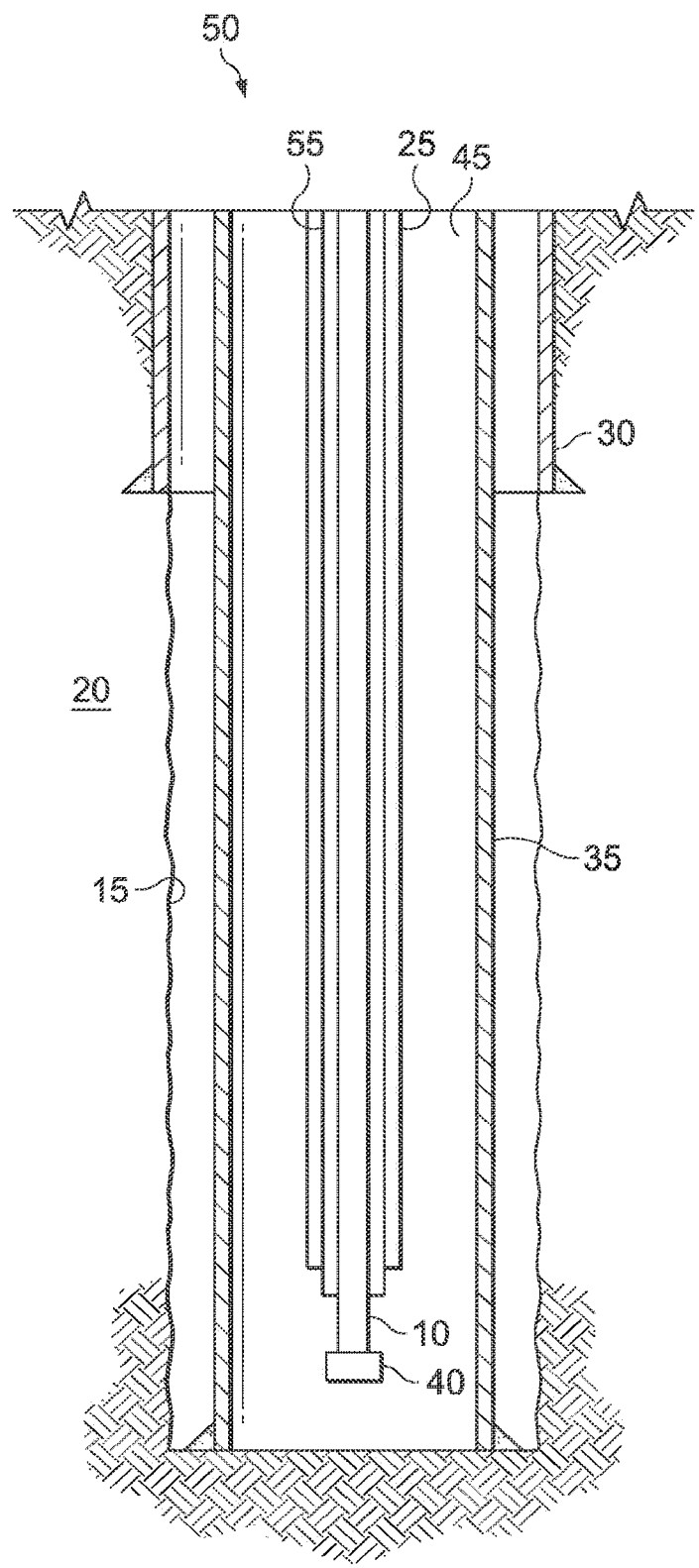
FIG. 2 is a cross-section illustrating another example cement locating system having a retrievable sensing system of another configuration in accordance with the examples disclosed herein.

FIG. 2 is a cross-section illustrating an example cement locating system 50 having a retrievable sensing system 10 of another configuration in accordance with the examples disclosed herein. Cement locating system 50 comprises a retrievable sensing system 10. Retrievable sensing system 10 may be any sensing system disclosed herein and may comprise a fiber optic cable or other telemetry cable coupled to a retrievable conduit 55. Retrievable conduit 55 may be any type of conduit used in a wellbore including tubing, coiled tubing, drillpipe, stick pipe, production tubing, etc. As illustrated, retrievable conduit 55 may extend downhole into wellbore 15 which penetrates subterranean formation 20. Retrievable conduit 55 may be lowered through conduit 25, past surface casing 30, and into production casing 35. At the terminal end of the retrievable sensing system 10 is bottomhole pressure and temperature gauge 40. As the cement composition is pumped down production casing annulus 45, retrievable sensing system 10 may sense the omnidirectional acoustic emission signal emitted from the implosion of the hollow beads when the cement composition reaches a depth where the pressure in wellbore 15 exceeds the crush pressure of the hollow beads. Via retrievable sensing system 10, the sensed acoustic emission signal may then convey to the wellbore operator that the cement composition has arrived at its target location.

The wellbore operator may then retrieve retrievable sensing system 10 by withdrawing retrievable conduit 55 to which retrievable sensing system 10 is coupled. Retrievable conduit 55 may be withdrawn uphole through conduit 25 and back to the surface.

Figure 3:
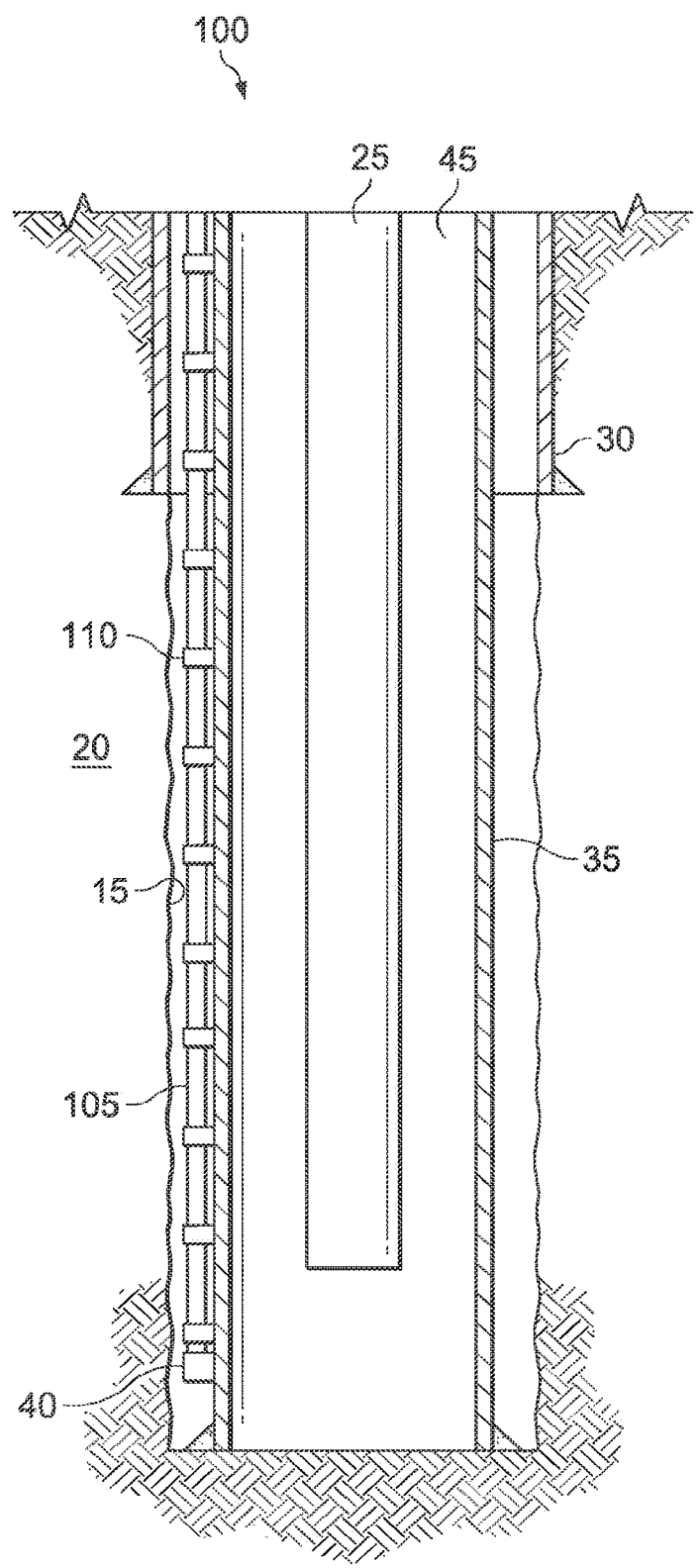
FIG. 3 is a cross-section illustrating another example cement locating system having a permanent sensing system of one configuration in accordance with the examples disclosed herein.

FIG. 3 is a cross-section illustrating an example cement locating system 100 having a permanent sensing system 105 of one example configuration in accordance with the examples disclosed herein. Cement locating system 100 comprises a permanent sensing system 105. Permanent sensing system 105 may be any sensing system disclosed herein and may comprise a fiber optic cable or other telemetry cable coupled to production casing 35 via cross-coupling protectors 110. Cross-coupling protectors 110 may be distributed regularly or irregularly on production casing 35 in a desired distribution sequence. As illustrated, permanent sensing system 105 may extend downhole into wellbore 15 which penetrates subterranean formation 20. Permanent sensing system 105 may run downhole to a depth past surface casing 30 and the terminal end of conduit 25. At the terminal end of permanent sensing system 105 is the bottomhole pressure and temperature gauge 40. As the cement is pumped down production casing annulus 45, permanent sensing system 105 may sense the omnidirectional acoustic emission signal emitted from the implosion of the hollow beads when the cement composition reaches a depth where the pressure in wellbore 15 exceeds the crush pressure of the hollow beads. Via permanent sensing system 105, the sensed acoustic emission signal may then convey to the wellbore operator that the cement composition has arrived at its target location. As permanent sensing system 105 is a permanent system within wellbore 15, permanent sensing system 105 may be used to monitor the cement sheath and well throughout the lifetime of the well.

Figure 4:
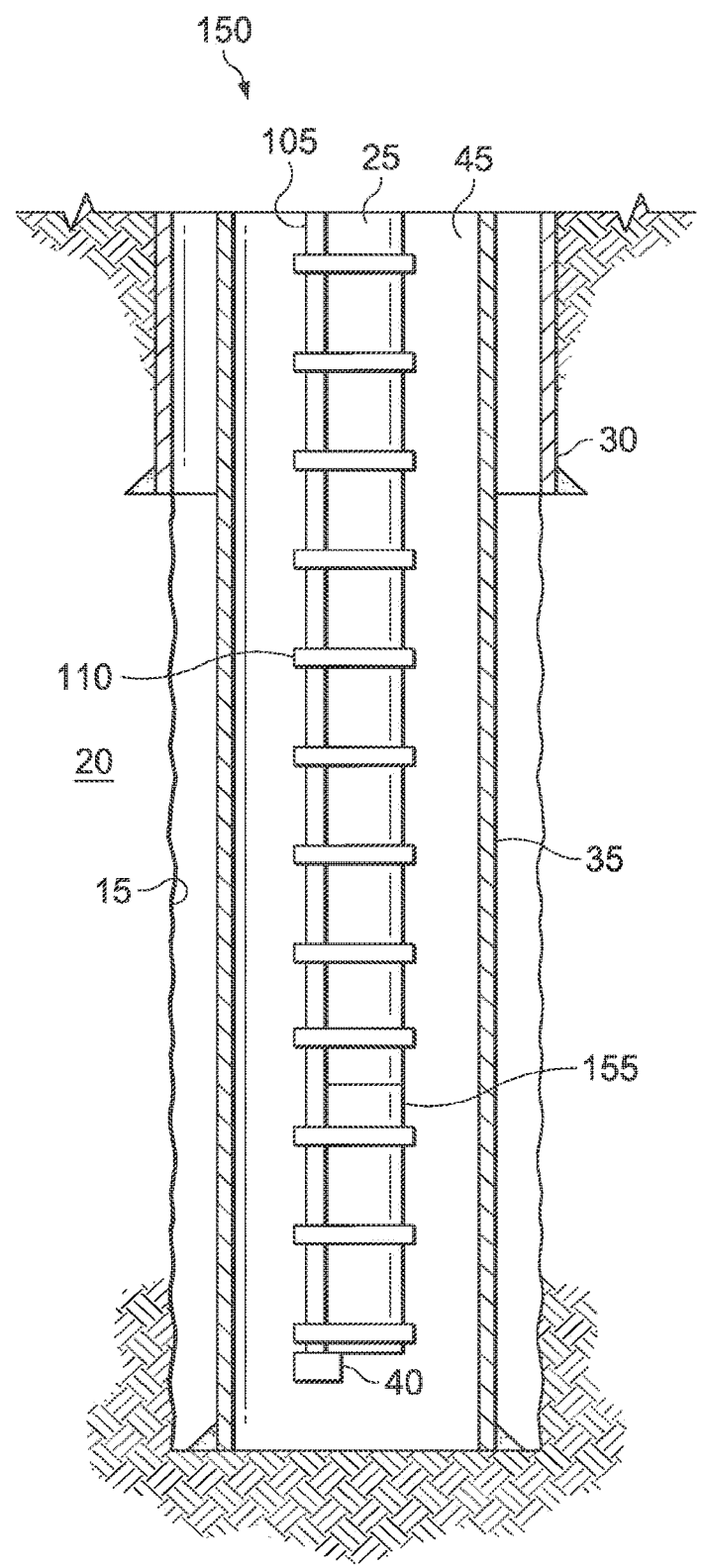
FIG. 4 is a cross-section illustrating another example cement locating system having a permanent sensing system of another configuration in accordance with the examples disclosed herein.

FIG. 4 is a cross-section illustrating an example cement locating system 150 having a permanent sensing system 105 of another configuration in accordance with the examples disclosed herein. Cement locating system 150 comprises a permanent sensing system 105. Permanent sensing system 105 may be any sensing system disclosed herein and may comprise a fiber optic cable or other telemetry cable coupled to conduit 25 via cross-coupling protectors 110. Cross-coupling protectors 110 may be distributed regularly or irregularly on conduit 25 in a desired distribution sequence. The tail 155 of conduit 25 may be extended as desired (e.g., below the bottom perforation). As illustrated, permanent sensing system 105 may extend downhole into wellbore 15 which penetrates subterranean formation 20. At the terminal end of permanent sensing system 105 is the bottomhole pressure and temperature gauge 40. As the cement composition is pumped down production casing annulus 45 the permanent sensing system 105 may sense the omnidirectional acoustic emission signal emitted from the implosion of the hollow beads when the cement composition reaches a depth where the pressure in wellbore 15 exceeds the crush pressure of the hollow beads. Via permanent sensing system 105, the sensed acoustic emission signal may then convey to the wellbore operator that the cement composition has arrived at its target location. As permanent sensing system 105 is a permanent system within wellbore 15, the permanent sensing system 105 may be used to monitor the cement sheath and well throughout the lifetime of the well.

FIGS. 1-4 describe configurations for the location of the sensing system for later use in a reverse circulation cementing operation. A reverse circulation cementing operation is a cementing operation in which the cement is pumped down an annulus to its target location instead of through a conduit and then uphole through the annulus to its target location as is done in typical primary cementing operations. As the hollow beads implode upon exceeding their crush pressure, a regular cementing operation would result in the implosion of the hollow beads as the cement is pumped downhole through the conduit instead of imploding at the target location which would be in the annulus uphole from the terminal end of the conduit. As such, the methods described herein may be modified to be used in typical primary cementing operations by using the sensing systems to listen for delayed hollow bead implosions. Some proportion of the hollow beads may not implode immediately even at pressures exceeding their crush pressure. This delayed proportion will eventually implode, however, and the decaying implosion rate at which this delayed implosion occurs may be used to determine the location of a cement even in typical primary cementing operations where the cement is pumped downhole through a conduit and then uphole into an annulus. This method of use for conventional cementing may comprise placing the slurry with hollow beads that have a greater pressure rating then the bottom hole pressure and then pressurizing the well to a pressure lower than the facture gradient and imploding the hollow beads.

Example systems may comprise a pump fluidly coupled to a tubular, the tubular containing a cement composition comprising the hollow beads as described herein. The pump may be a high-pressure pump or a low-pressure pump. As used herein, the term "high pressure pump" will refer to a pump that is capable of delivering a fluid downhole at a pressure of about 1000 psi or greater. Suitable high-pressure pumps will be known to one having ordinary skill in the art and may include, but are not limited to, floating piston pumps and positive displacement pumps. In other examples, the pump may be a low-pressure pump. As used herein, the term "low pressure pump" will refer to a pump that operates at a pressure of about 1000 psi or less. Suitable low-pressure pumps will be known to one having ordinary skill in the art.

In some examples, the systems described herein may further comprise a mixing tank that is upstream of the pump and is the vessel in which the cement composition is formulated. In various examples, the pump (e.g., a low-pressure pump, a high-pressure pump, or a combination thereof) may convey the cement composition from the mixing tank to the transporting conduit. In other examples, the cement composition may be formulated offsite and transported to a worksite, in which case the cement composition may be introduced to the transporting conduit via the pump either directly from its shipping container (e.g., a truck, a railcar, a barge, or the like) or from a transport pipeline. In either case, the cement composition may be drawn into the pump, elevated to an appropriate pressure, and then introduced into the transporting conduit for delivery downhole.

When desired for use, the hollow beads may be added to a cement composition. The cement composition may be introduced into a wellbore to perform a cementing operation. As discussed above, different species of hollow beads with differing crush pressures and acoustic emission signal frequencies may be added to different portions of the cement composition. The concentration of the hollow beads in the cement composition may be dependent upon the amount of hollow beads required to produce a measurable acoustic emission signal of a desired resolution.

Figure 5:
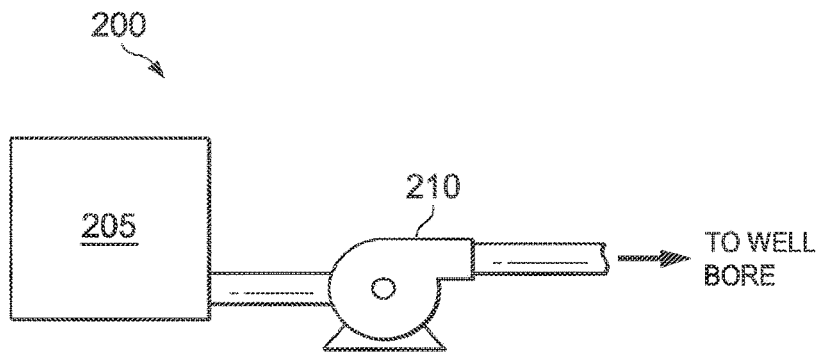
FIG. 5 is a schematic illustrating mixing and pumping equipment used in the preparation of a cement composition in accordance with the examples disclosed herein.

Referring now to FIG. 5, a schematic illustrating mixing and pumping equipment for the preparation of a cement composition comprising the hollow beads is illustrated in accordance with the examples disclosed herein. FIG. 5 illustrates a system 200 for preparation of a cement composition comprising the hollow beads. The hollow beads may be added to the cement composition and mixed in mixing equipment 205. Mixing equipment 205 may be any mixer sufficient for mixing the hollow beads with the cement composition or the dry components of the cement composition. Examples of mixing equipment 205 may include, but are not limited to, a jet mixer, re-circulating mixer, a batch mixer, and the like. In some examples, mixing equipment 205 may be a jet mixer and may continuously mix the cement composition as it is pumped to the wellbore. The hollow beads may be added to mixing equipment 205 first or, alternatively, the cement composition may be added to mixing equipment 205 first. In some examples, the cement composition may be formulated in mixing equipment 205 such that the components of the cement composition, including the hollow beads, may be added to the mixing equipment 205 in any order and mixed to provide the desired cement composition formulation. In some examples, different species of hollow beads with differing crush pressures and acoustic emission signal frequencies may be added to different portions of the cement composition and mixed separately in mixing equipment 205. Alternatively, the different species of hollow beads may be added to different portions of the cement composition on-the-fly as the cement composition is introduced into the wellbore After the cement composition has been mixed in mixing equipment 205, the cement composition may be pumped to the wellbore via pumping equipment 210. In some examples, the mixing equipment 205 and the pumping equipment 210 may be disposed on one or more cement trucks as will be apparent to those of ordinary skill in the art. Examples of pumping equipment 210 include, but are not limited to, floating piston pumps, positive displacement pumps, centrifugal pumps, peristaltic pumps, and diaphragm pumps.

Figure 6:
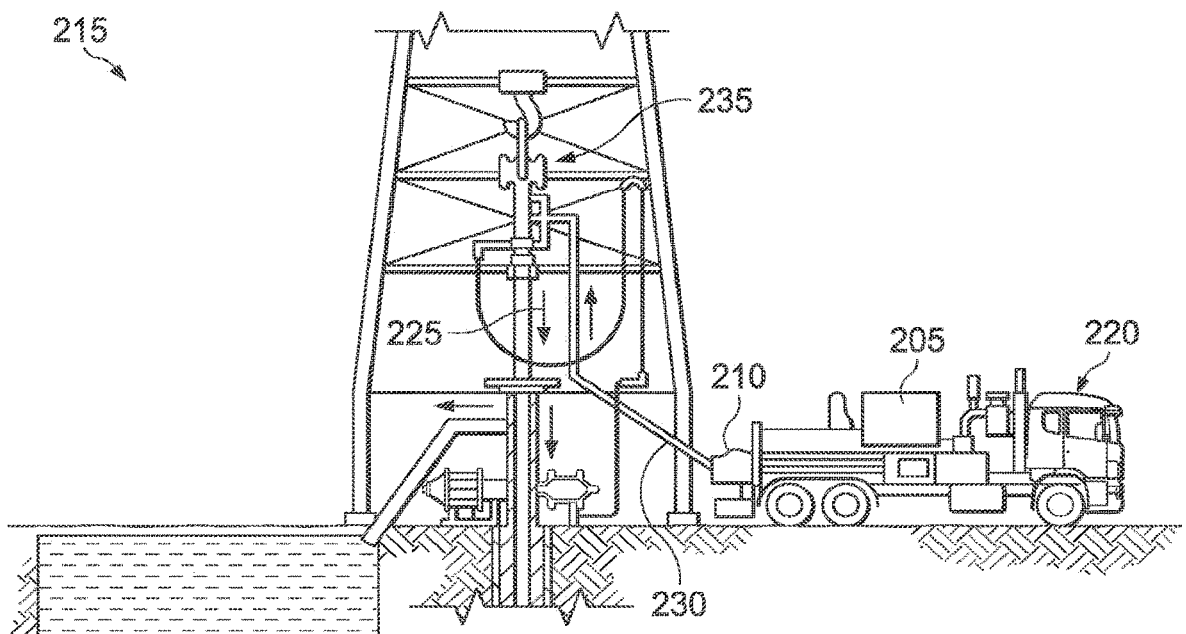
FIG. 6 is a schematic illustrating surface equipment used for the placement of a cement composition in accordance with the examples disclosed herein.

FIG. 6 is a schematic illustrating surface equipment 215 used for the placement of a cement composition 225 comprising the hollow beads in accordance with the examples disclosed herein. It should be noted that while FIG. 6 generally depicts a land-based operation, those skilled in the art will readily recognize that the principles described herein are equally applicable to subsea operations that employ floating or sea-based platforms and rigs without departing from the scope of the disclosure. As illustrated, the surface equipment 215 may include a cementing unit 220, which may include one or more cement trucks. The cementing unit 220 may include mixing equipment 205 and pumping equipment 210 as will be apparent to those of ordinary skill in the art. The cementing unit 220 may pump a cement composition 225 through feed pipe 230 and to a cementing head 235, which conveys the cement composition 225 downhole into a wellbore.

Figure 7:
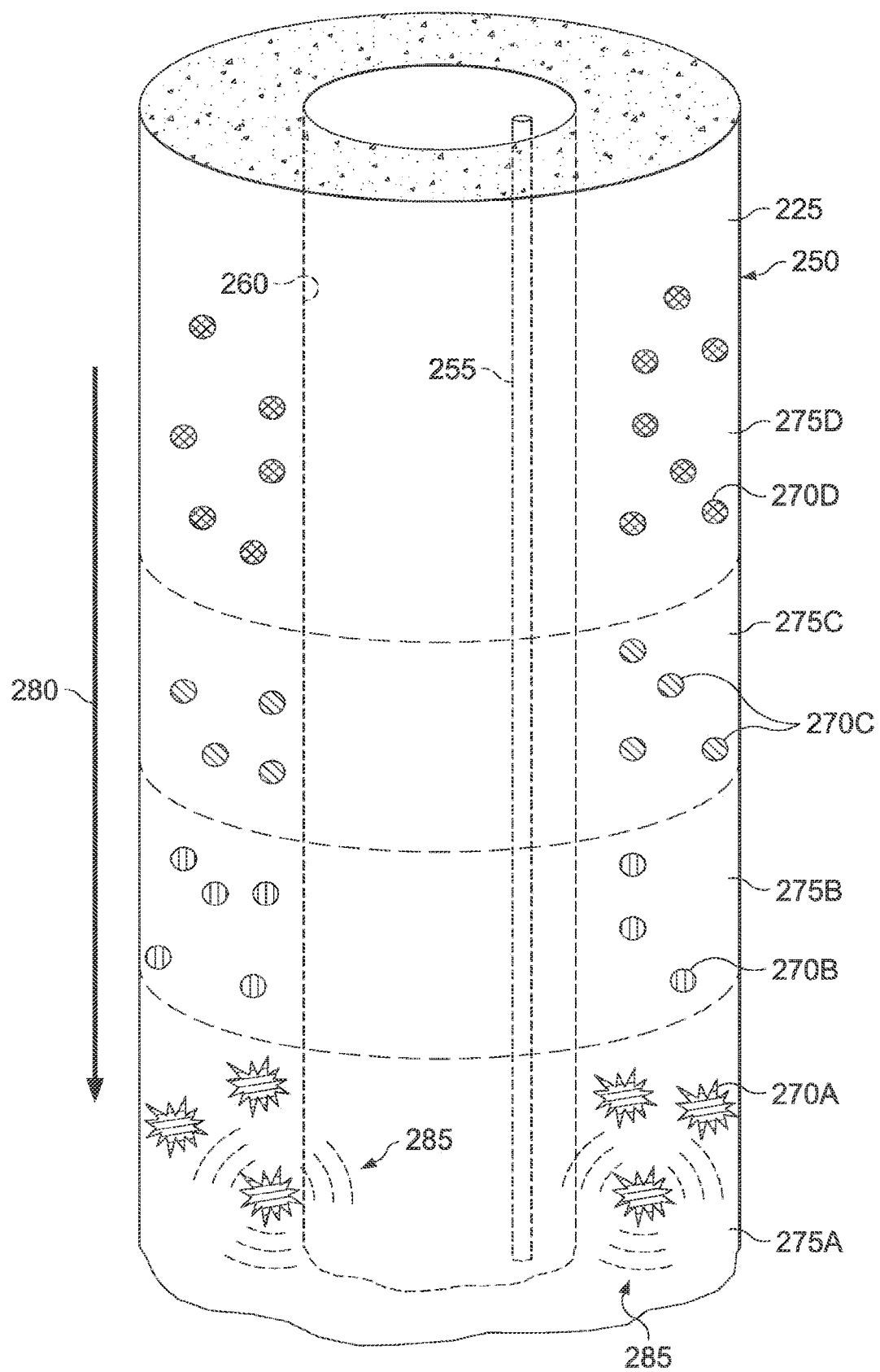
FIG. 7 is a schematic illustrating a method for locating a portion of a cement composition during a reverse circulation cementing operation in accordance with the examples disclosed herein.

Turning now to FIG. 7, FIG. 7 is a schematic illustrating a method for locating a portion of a cement composition during a reverse circulation cementing operation in accordance with the examples disclosed herein. As illustrated, cement composition 225 may be pumped into annulus 250. Prior to beginning the reverse circulation cementing operation, sensing system 255 is installed inside conduit 260. In this specific example, sensing system 255 comprises a fiber optic cable. The cement composition 225 comprises four pluralities of hollow beads designated by reference markers 270A, 270B, 270C, and 270D respectively. Each plurality of hollow beads 270A, 270B, 270C, and 270D is a different species of hollow bead possessing a different crush pressure and emitting a different acoustic signal frequency when imploded. Each plurality of hollow beads 270A, 270B, 270C, and 270D is placed in a different portion of cement composition 225 designated cement portions 275A, 275B, 275C, and 275D respectively. The pluralities of hollow beads 270A, 270B, 270C, and 270D are individually distributed in a respective cement portion 275A, 275B, 275C, and 275D such that no two pluralities of hollow beads 270A, 270B, 270C, and 270D are distributed within the same cement portion 275A, 275B, 275C, and 275D.

As the cement composition 225 is pumped downhole through annulus 250, wellbore pressure increases in the direction of arrow 280 as illustrated. When the first plurality of hollow beads 270A is transported to a depth where the wellbore pressure exceeds the crush pressure of the hollow beads within the plurality of hollow beads 270A, the hollow beads may implode and emit omnidirectional acoustic signals 285. The omnidirectional acoustic signals 285 may be sensed by sensing system 255. Sensing system 255 may convey the sensed omnidirectional acoustic signal 285 to a wellbore operator who may determine from the frequency of the sensed omnidirectional acoustic signal 285 that the plurality of hollow beads 270A has reached a depth with a wellbore pressure exceeding the crush pressure of the hollow beads in the plurality of hollow beads 270A, and that the cement portion 275A into which the plurality of hollow beads 270A was distributed has also reached that wellbore depth. The sensing system 255 may continue to monitor and sense the implosion of the other pluralities of hollow beads 270B, 270C, and 270D, allowing the wellbore operator to determine when their respective cement portions have reached wellbore depths exceeding the crush pressures of the remaining pluralities of hollow beads 270B, 270C, and 270D. As such, the wellbore operator may be able to determine when any portion of the cement composition 255 has reached a target location.

Figure 10:
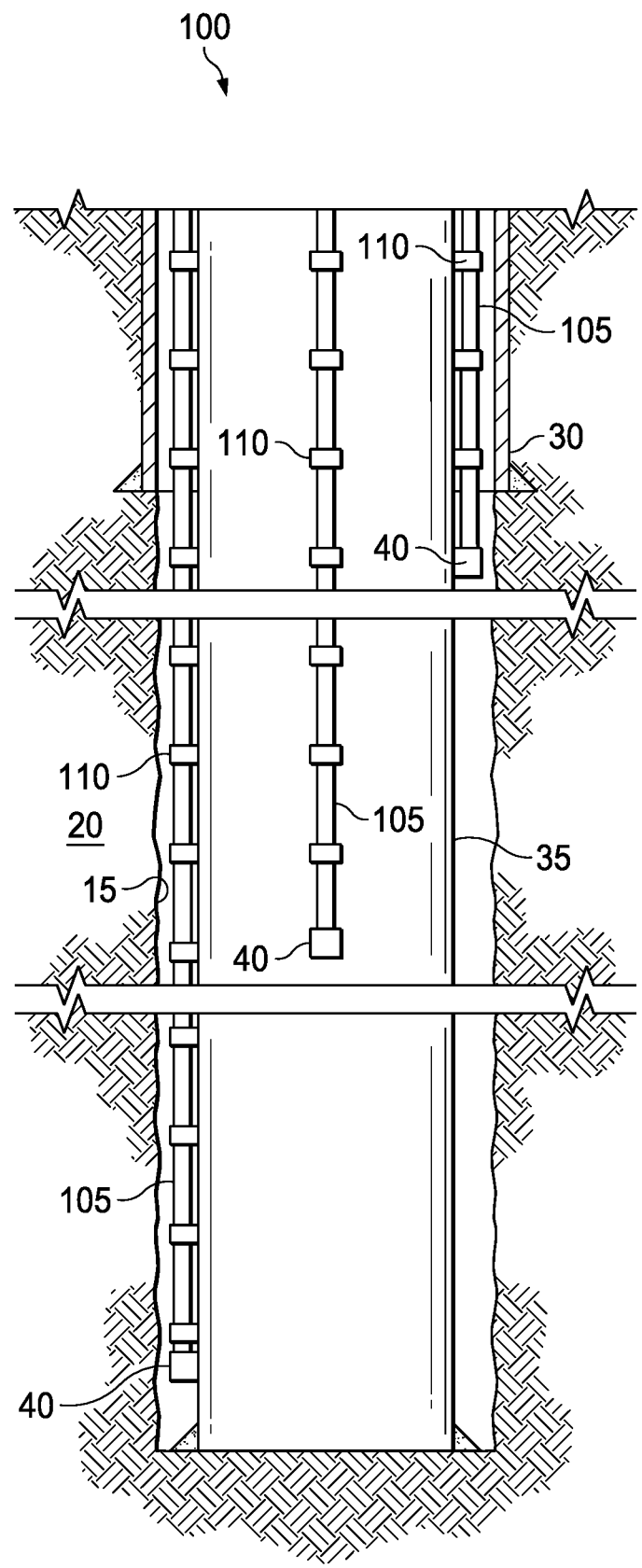
FIG. 10 is a cross-section illustrating an example of multiple cement locating systems as shown in FIG. 3 in accordance with the examples disclosed herein.

FIG. 10 is a cross-section illustrating an example cement locating system 100 having multiple permanent sensing systems 105 in accordance with the examples disclosed herein. Cement locating system 100 comprises three permanent sensing systems 105 in different positions and terminating at different locations. Permanent sensing system 105 may be any sensing system disclosed herein and may comprise a fiber optic cable or other telemetry cable coupled to production casing 35 via cross-coupling protectors 110. Cross-coupling protectors 110 may be distributed regularly or irregularly on production casing 35 in a desired distribution sequence. As illustrated, the permanent sensing systems 105 may extend downhole into wellbore 15 which penetrates subterranean formation 20. Permanent sensing system 105 may run downhole to a desired depth. At the terminal end of a permanent sensing system 105 is the bottomhole pressure and temperature gauge 40. As the cement is pumped down production casing annulus 45, at least one of the permanent sensing systems 105 may sense the omnidirectional acoustic emission signal emitted from the implosion of the hollow beads when the cement composition reaches a depth where the pressure in wellbore 15 exceeds the crush pressure of the hollow beads. Via permanent sensing system 105, the sensed acoustic emission signal may then convey to the wellbore operator that the cement composition has arrived at its target location. As permanent sensing system 105 is a permanent system within wellbore 15, permanent sensing system 105 may be used to monitor the cement sheath and well throughout the lifetime of the well.

Figure 11:
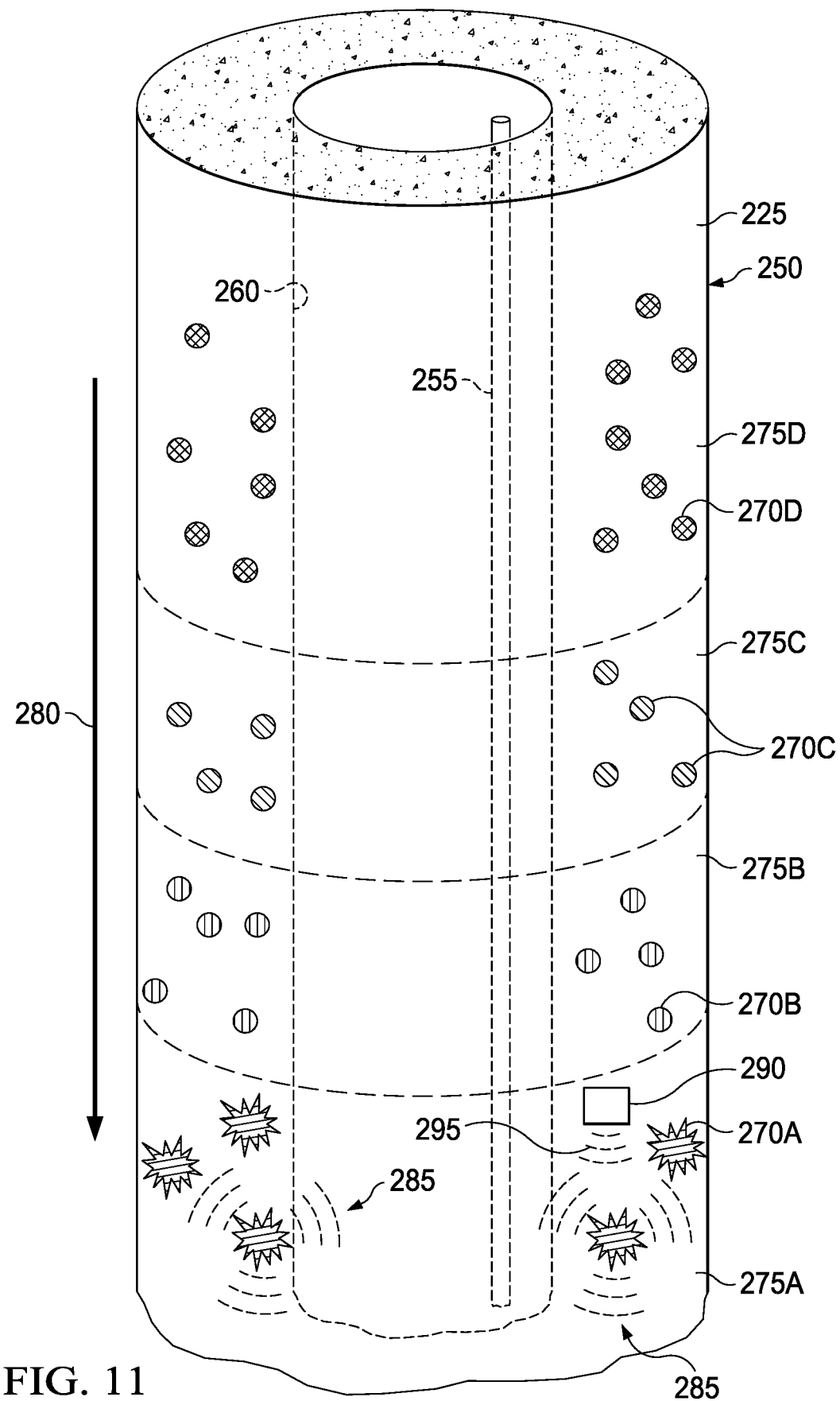
FIG. 11 is a schematic illustrating an emitter disposed in the wellbore system shown in FIG. 7 in accordance with the examples disclosed herein.

FIG. 11 is a schematic illustrating a method for locating a portion of a cement composition during a reverse circulation cementing operation in accordance with the examples disclosed herein. As illustrated, cement composition 225 may be pumped into annulus 250. Prior to beginning the reverse circulation cementing operation, sensing system 255 is installed inside conduit 260. In this specific example, sensing system 255 comprises a fiber optic cable. The cement composition 225 comprises four pluralities of hollow beads designated by reference markers 270A, 270B, 270C, and 270D respectively. Each plurality of hollow beads 270A, 270B, 270C, and 270D is a different species of hollow bead possessing a different crush pressure and emitting a different acoustic signal frequency when imploded. Each plurality of hollow beads 270A, 270B, 270C, and 270D is placed in a different portion of cement composition 225 designated cement portions 275A, 275B, 275C, and 275D respectively. The pluralities of hollow beads 270A, 270B, 270C, and 270D are individually distributed in a respective cement portion 275A, 275B, 275C, and 275D such that no two pluralities of hollow beads 270A, 270B, 270C, and 270D are distributed within the same cement portion 275A, 275B, 275C, and 275D.

As the cement composition 225 is pumped downhole through annulus 250, wellbore pressure increases in the direction of arrow 280 as illustrated. When the first plurality of hollow beads 270A is transported to a depth proximate an emitter 290, the emitter 290 may emit an acoustic signal 295 at the resonance frequency of the hollow beads 270A which may implode and emit omnidirectional acoustic signals 285. The omnidirectional acoustic signals 285 may be sensed by sensing system 255. Sensing system 255 may convey the sensed omnidirectional acoustic signal 285 to a wellbore operator who may determine from the frequency of the sensed omnidirectional acoustic signal 285 that the plurality of hollow beads 270A has reached a depth with a wellbore pressure exceeding the crush pressure of the hollow beads in the plurality of hollow beads 270A, and that the cement portion 275A into which the plurality of hollow beads 270A was distributed has also reached that wellbore depth. The sensing system 255 may continue to monitor and sense the implosion of the other pluralities of hollow beads 270B, 270C, and 270D, allowing the wellbore operator to determine when their respective cement portions have reached wellbore depths exceeding the crush pressures of the remaining pluralities of hollow beads 270B, 270C, and 270D. As such, the wellbore operator may be able to determine when any portion of the cement composition 255 has reached a target location. The acoustic emitter 290 may emit an acoustic frequency at the resonance frequency of any grouping of the hollow beads, and in some examples all groupings, which may induce the implosion of the hollow beads. The emitter 290 may be used to trigger the implosion of a specific plurality of beads, but not others, depending on their resonance frequencies, bandwidths, and Q factors. The acoustic emitter may be located at any position of interest in the wellbore.

It should be clearly understood that the examples illustrated by FIGS. 1-7 are merely general applications of the principles of this disclosure in practice, and a wide variety of other examples are possible. Therefore, the scope of this disclosure is not limited in any manner to the details of FIGS. 1-7 described herein.

It is also to be recognized that the disclosed cement compositions may also directly or indirectly affect the various downhole equipment and tools that may come into contact with the cement compositions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-7.

EXAMPLES

The present disclosure can be better understood by reference to the following example, which is offered by way of illustration. The present disclosure is not limited to the example provided herein.

Example 1

Figure 8:
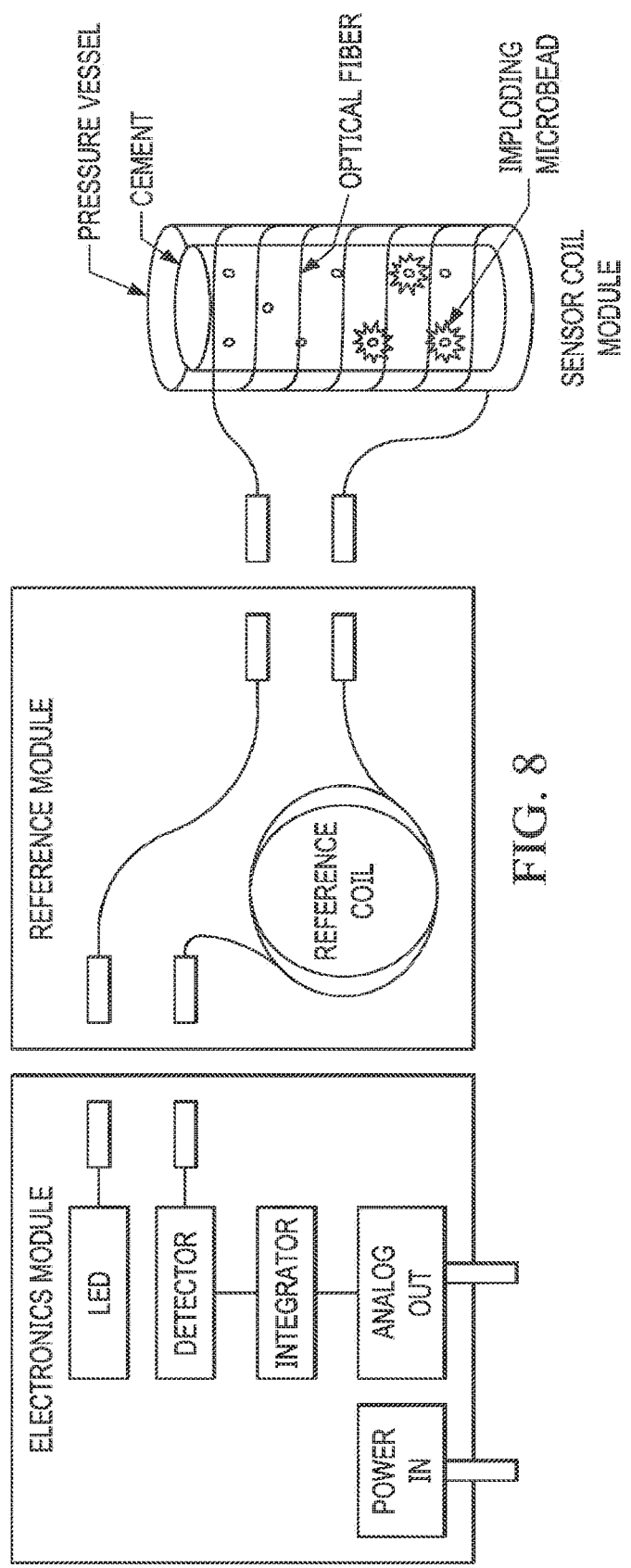
FIG. 8 is a schematic illustrating an experimental set-up for an experiment testing an example cement locating system in accordance with the examples disclosed herein.

Example 1 illustrates a proof-of-concept experiment. A pressure vessel containing 28 g of silica microbeads (HGS-6000), a species of hollow bead, was filled with water and wrapped with 10 meters of pre-tensioned (few gram-force) Corning SMF-28 single-mode optical fiber (i.e., a sensing system loop) and fusion spliced in series into a 500-m asymmetric reference coil in a Sagnac fiber strain-rate sensing interferometer circuit configuration illustrated in FIG. 8. FIG. 8 is a schematic illustrating an experimental set-up for the experimental cement locating system of Example 1 in accordance with the examples disclosed herein.

Time-dependent average dynamic strain rates of the 10-m fiber sensing coil were monitored as time-dependent voltage waveforms of the analog optical receiver output while the internal hydrostatic pressure was slowly raised from 300 PSI to 9000 PSI over an approximately 60-minute duration. Fundamentally, the acoustic emission signals generated inside the chamber by the imploding microbeads cause reactive chamber wall surface area strains which are imparted directly to the tightly coupled fiber sensor loop. These surface area strains result in non-reciprocal Sagnac effect optical interferometric phase changes that are directly proportional to the coupled fiber sensor loop strain rate. This non-reciprocal interferometric phase change (optical path length imbalance) is detected as an optical intensity modulation which contains baseband acoustic frequencies and acoustic power information (acoustic spectral power). Initial recorded signals indicate system sensitivities close to a few µPa at 10 kHz.

Figure 9:
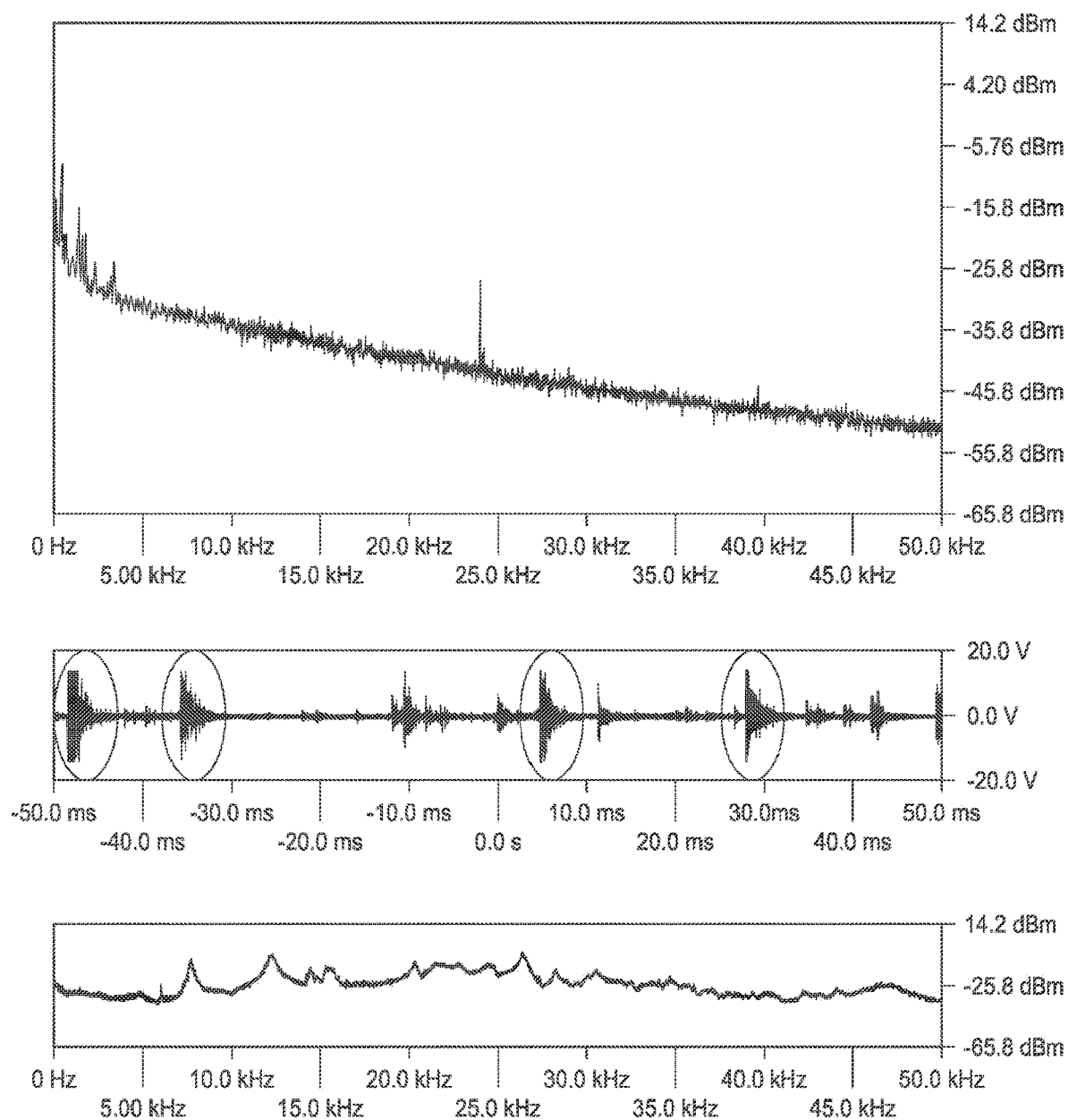
FIG. 9 are spectra illustrating the data generated from the experiment of FIG. 8 in accordance with the examples disclosed herein.

Experimental results showing an increase of spectral power of 5 dB (at 5 kHz) to 20 dB (at 50 kHz) upon the onset of implosions of the hollow beads at pressure are displayed in FIG. 9. While the magnitude of the acoustic signals vary (likely due to the number of hollow beads imploding simultaneously), the spectral response was consistent. Increases in pressure resulted in different sets of hollow bead implosions but with the same spectral shape.

Provided are cement compositions for use in a subterranean formation in accordance with the disclosure and the illustrated FIGS. 1-9. An example cement composition comprises a hydraulic cement, a first plurality of hollow beads distributed in a first portion of the cement composition; wherein the first plurality of hollow beads comprises hollow beads having a first crush pressure and configured to emit a first acoustic signal frequency when imploded, and a second plurality of hollow beads distributed in a second portion of the cement composition; wherein the second plurality of hollow beads comprises hollow beads having a second crush pressure and configured to emit a second acoustic signal frequency when imploded. The first crush pressure and the second crush pressure may be different, and the first acoustic signal frequency and the second acoustic signal frequency may be different.

Additionally or alternatively, the cement composition may include one or more of the following features individually or in combination. The hollow beads in the first plurality of hollow beads may differ from the hollow beads in the second plurality of hollow beads in at least one physical property selected from the group consisting of source material, diameter, wall thickness, bead size, bead shape, mechanical strength, brittleness, glass transition temperature, melting temperature, degradation rate when exposed to acids, bases, or organics; and any combination thereof. The hollow beads in the first plurality of hollow beads and the hollow beads in the second plurality of hollow beads may be individually selected from the group consisting of hollow glass beads, hollow ceramic beads, hollow plastic beads, hollow metal beads, hollow resin beads, hollow composite beads, composites thereof, and any combination thereof. The hollow beads in the first plurality of hollow beads and the hollow beads in the second plurality of hollow beads may be individually selected from the group consisting of glass spheres, glass microspheres, ceramic spheres, cenospheres, plastic spheres, metal spheres, composites thereof, and any combination thereof. The hollow beads in the first plurality of hollow beads and the hollow beads in the second plurality of hollow beads maybe produced from materials individually selected from the group consisting of glass, silicates, soda lime, borosilicates, fly ash, ceramic, resins, metals, polymers, composites thereof, and any combination thereof. The first portion of the cement composition may comprise a third plurality of hollow beads having a third crush pressure and configured to emit a third acoustic signal frequency when imploded.

Provided are methods for locating a cement in a wellbore in accordance with the disclosure and the illustrated FIGS.

1-9. An example method comprises deploying a sensing system in the wellbore; introducing the cement composition into the wellbore; wherein the cement composition comprises: a cement, and hollow beads having a crush pressure and configured to emit an acoustic signal when imploded. The method further comprises pumping the cement composition through the wellbore to a depth with a wellbore pressure exceeding the crush pressure of the hollow beads to induce implosion of the hollow beads and the emission of the acoustic signal; sensing the emitted acoustic signal; and determining the location of the cement composition in the wellbore from the sensed emitted acoustic signal.

Additionally or alternatively, the method may include one or more of the following features individually or in combination. The determining the location of the cement composition in the wellbore may occur during the pumping of the cement composition. The hollow beads may comprise at least two pluralities of hollow beads; wherein each plurality of hollow beads comprises hollow beads configured to have a different crush pressure and a different frequency of acoustic signal emission from the other plurality of hollow beads. The method may further comprise sensing the emitted acoustic signal from each plurality of hollow beads. The sensing system may comprise a sensing system selected from the group consisting of Sagnac Effect interferometric sensing systems, Rayleigh backscatter time or frequency domain acoustic sensing systems, Fizeau sensing systems, Fabry-Perot sensing systems, Michelson sensing systems, Mach-Zehnder sensing systems, pseudo-distributed point fiber Bragg gratings systems, macro- or microbending attenuation sensor, point pressure systems (e.g., piezoelectric, electromechanical, accelerometer, microphone, geophone, etc.) coupled to a fiber optic cable or electrical telemetry system, composites thereof, and any combination thereof. The sensing system may be retrievable from the wellbore. The sensing system may not be retrievable from the wellbore. The method may further comprise at least two additional sensing systems in the wellbore; wherein each individual sensing system is deployed in a different position, or a different orientation, from each other individual sensing system, or a combination of different position and orientation. The method may further comprise triangulating the position of the senses emitted acoustic signal. The wellbore may comprise a loss zone; and wherein the method further comprises locating the loss zone during the pumping of the cement composition. The method may further comprise deploying an acoustic emitter in the wellbore; wherein the acoustic emitter emits an acoustic signal at the resonance frequency of the hollow beads.

Provided are systems for locating a cement in a wellbore in accordance with the disclosure and the illustrated FIGS. 1-9. An example system comprises a cement composition comprising: a cement, and hollow beads having a crush pressure and configured to emit an acoustic signal when imploded. The system further comprises a sensing system deployed in the wellbore; wherein the sensing system is configured to sense the emitted acoustic signal of the imploded hollow beads during the pumping of the cement composition.

Additionally or alternatively, the method may include one or more of the following features individually or in combination. The hollow beads may comprise at least two pluralities of hollow beads; wherein each plurality of hollow beads comprises hollow beads configured to have a different crush pressure and a different frequency of acoustic signal emission from the other plurality of hollow beads. The method may further comprise sensing the emitted acoustic signal from each plurality of hollow beads. The sensing system may comprise a sensing system selected from the group consisting of Sagnac Effect interferometric sensing systems, Rayleigh backscatter time or frequency domain acoustic sensing systems, Fizeau sensing systems, Fabry-Perot sensing systems, Michelson sensing systems, Mach-Zehnder sensing systems, pseudo-distributed point fiber Bragg gratings systems, macro- or microbending attenuation sensor, point pressure systems (e.g., piezoelectric, electromechanical, accelerometer, microphone, geophone, etc.) coupled to a fiber optic cable or electrical telemetry system, composites thereof, and any combination thereof. The sensing system may be retrievable from the wellbore. The sensing system may not be retrievable from the wellbore. The sensing system may be retrievable from the wellbore. The sensing system may not be retrievable from the wellbore. The system may further comprise at least two additional sensing systems in the wellbore; wherein each individual sensing system is deployed in a different position, or a different orientation, from each other individual sensing system, or a combination of different position and orientation. The system may be configured to triangulate the position of the sensed emitted acoustic signal. The wellbore may comprise a loss zone; and wherein the method further comprises locating the loss zone during the pumping of the cement composition. The method may further comprise deploying an acoustic emitter in the wellbore; wherein the acoustic emitter emits an acoustic signal at the resonance frequency of the hollow beads.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:
1. A cement composition for use in a subterranean formation, the cement composition comprising:
a hydraulic cement;
a first plurality of hollow beads distributed in a first portion of the cement composition; wherein the first plurality of hollow beads comprises hollow beads having a first crush pressure and configured to emit a first acoustic signal frequency when imploded; wherein at least a portion of the hollow beads in the first plurality comprises a resonance frequency configured to match an acoustic signal emitted by an acoustic emitter deployed in a wellbore penetrating the subterranean formation; and a second plurality of hollow beads distributed in a second portion of the cement composition; wherein the second plurality of hollow beads comprises hollow beads having a second crush pressure and configured to emit a second acoustic signal frequency when imploded;

wherein the first crush pressure and the second crush pressure are different; and wherein the first acoustic signal frequency and the second acoustic signal frequency are different.

2. The cement composition of claim 1, wherein the hollow beads in the first plurality of hollow beads differ from the hollow beads in the second plurality of hollow beads in at least one physical property selected from the group consisting of source material, diameter, wall thickness, bead size, bead shape, mechanical strength, brittleness, glass transition temperature, melting temperature, degradation rate when exposed to acids, bases, or organics; and any combination thereof.

3. The cement composition of claim 1, wherein the hollow beads in the first plurality of hollow beads and the hollow beads in the second plurality of hollow beads are individually selected from the group consisting of hollow glass beads, hollow ceramic beads, hollow plastic beads, hollow metal beads, hollow resin beads, hollow composite beads, composites thereof, and any combination thereof.

4. The cement composition of claim 1, wherein the hollow beads in the first plurality of hollow beads and the hollow beads in the second plurality of hollow beads are individually selected from the group consisting of glass spheres, glass microspheres, ceramic spheres, cenospheres, plastic spheres, metal spheres, composites thereof, and any combination thereof.

5. The cement composition of claim 1, wherein the hollow beads in the first plurality of hollow beads and the hollow beads in the second plurality of hollow beads are produced from materials individually selected from the group consisting of glass, silicates, soda lime, borosilicates, fly ash, ceramic, resins, metals, polymers, composites thereof, and any combination thereof.

6. The cement composition of claim 1, wherein the first portion of the cement composition comprises a third plurality of hollow beads having a third crush pressure and configured to emit a third acoustic signal frequency when imploded.

7. A method for locating a cement composition in a wellbore, the method comprising:
deploying a sensing system in the wellbore;
deploying an acoustic emitter in the wellbore; wherein the acoustic emitter emits an acoustic signal at the resonance frequency of the hollow beads;
introducing the cement composition into the wellbore; wherein the cement composition comprises:
a cement, and
hollow beads having a crush pressure and configured to emit an acoustic signal when imploded;
pumping the cement composition through the wellbore to a depth with a wellbore pressure exceeding the crush pressure of the hollow beads to induce implosion of the hollow beads and the emission of the acoustic signal;
sensing the emitted acoustic signal; and
determining the location of the cement composition in the wellbore from the sensed emitted acoustic signal.

8. The method of claim 7, wherein the determining the location of the cement composition in the wellbore occurs during the pumping of the cement composition.

9. The method of claim 7, wherein the hollow beads comprise at least two pluralities of hollow beads; wherein each plurality of hollow beads comprises hollow beads configured to have a different crush pressure and a different frequency of acoustic signal emission from the other plurality of hollow beads.

10. The method of claim 9, further comprising sensing the emitted acoustic signal from each plurality of hollow beads.

11. The method of claim 7, wherein the sensing system comprises a sensing system selected from the group consisting of Sagnac Effect interferometric sensing systems, Rayleigh backscatter time or frequency domain acoustic sensing systems, Fizeau sensing systems, Fabry-Perot sensing systems, Michelson sensing systems, Mach-Zehnder sensing systems, pseudo-distributed point fiber Bragg gratings systems, macro- or microbending attenuation sensor, point pressure systems (e.g., piezoelectric, electromechanical, accelerometer, microphone, geophone, etc.) coupled to a fiber optic cable or electrical telemetry system, composites thereof, and any combination thereof.

12. The method of claim 7, wherein the sensing system is retrievable from the wellbore.

13. The method of claim 7, wherein the sensing system is not retrievable from the wellbore.

14. The method of claim 7, further comprising at least two additional sensing systems in the wellbore; wherein each individual sensing system is deployed in a different position, or a different orientation, from each other individual sensing system, or a combination of different position and orientation.

15. The method of claim 14, further comprising triangulating the position of the sensed emitted acoustic signal.

16. The method of claim 15, wherein the wellbore comprises a loss zone; and wherein the method further comprises locating the loss zone during the pumping of the cement composition.

17. A system for locating a cement composition in a wellbore; the system comprising:
the cement composition comprising:
a cement, and
hollow beads having a crush pressure and configured to emit an acoustic signal when imploded;
a sensing system deployed in the wellbore; wherein the sensing system is configured to sense the emitted acoustic signal of the imploded hollow beads during the pumping of the cement composition; and
an acoustic emitter deployed in the wellbore; wherein the acoustic emitter emits an acoustic signal at the resonance frequency of the hollow beads.

18. The system of claim 17, further comprising at least two additional sensing systems in the wellbore; wherein each individual sensing system is deployed in a different position, or a different orientation, from each other individual sensing system, or a combination of different position and orientation.

19. The system of claim 17, wherein the hollow beads comprise at least two pluralities of hollow beads; wherein each plurality of hollow beads comprises hollow beads configured to have a different crush pressure and a different frequency of acoustic signal emission from the other plurality of hollow beads.

20. The system of claim 17, wherein the sensing system comprises a sensing system selected from the group consisting of Sagnac Effect interferometric sensing systems, Rayleigh backscatter time or frequency domain acoustic sensing systems, Fizeau sensing systems, Fabry-Perot sensing systems, Michelson sensing systems, Mach-Zehnder sensing systems, pseudo-distributed point fiber Bragg gratings systems, macro- or microbending attenuation sensor, point pressure systems (e.g., piezoelectric, electromechanical, accelerometer, microphone, geophone, etc.) coupled to a fiber optic cable or electrical telemetry system, composites thereof, and any combination thereof.

* * * * *